(12) United States Patent
Mimar et al.

(10) Patent No.: US 11,057,450 B2
(45) Date of Patent: Jul. 6, 2021

(54) SYSTEMS, METHODS, AND DEVICES FOR SEAMLESS SWITCHING BETWEEN MULTIPLE SOURCE STREAMS

(71) Applicant: RGB Spectrum, Alameda, CA (US)

(72) Inventors: Tibet Mimar, Sunnyvale, CA (US); Scott Norder, Oakland, CA (US); Lynton Auld, Rohnert Park, CA (US)

(73) Assignee: RGB Spectrum, Alameda, CA (US)

( * ) Notice: Subject to any disclaimer, the term of this patent is extended or adjusted under 35 U.S.C. 154(b) by 154 days.

(21) Appl. No.: 15/616,767

(22) Filed: Jun. 7, 2017

(65) Prior Publication Data

US 2017/0353523 A1 Dec. 7, 2017

Related U.S. Application Data

(60) Provisional application No. 62/347,037, filed on Jun. 7, 2016.

(51) Int. Cl.
*H04L 29/06* (2006.01)
*H04L 12/24* (2006.01)
*H04L 12/819* (2013.01)
*H04L 12/853* (2013.01)

(52) U.S. Cl.
CPC .......... *H04L 65/80* (2013.01); *H04L 65/1089* (2013.01); *H04L 65/4084* (2013.01); *H04L 65/4092* (2013.01); *H04L 65/607* (2013.01); *H04L 65/608* (2013.01); *H04L 41/12* (2013.01); *H04L 47/21* (2013.01); *H04L 47/2416* (2013.01)

(58) Field of Classification Search
CPC . H04L 65/80; H04L 65/1089; H04L 65/4084; H04L 65/4092; H04L 65/607; H04L 65/608
USPC ........................................................ 709/219
See application file for complete search history.

(56) References Cited

U.S. PATENT DOCUMENTS

| 6,393,057 | B1 | 5/2002 | Thoreau et al. | |
|---|---|---|---|---|
| 7,430,222 | B2 | 9/2008 | Green et al. | |
| 8,005,988 | B2 | 8/2011 | Maes | |
| 8,321,905 | B1 | 11/2012 | Streeter et al. | |
| 8,660,178 | B2 * | 2/2014 | Berbecel | H04N 21/2365 375/240.03 |
| 8,806,047 | B2 * | 8/2014 | Evans | H04H 20/106 709/231 |

(Continued)

*Primary Examiner* — Esther B. Henderson
*Assistant Examiner* — Nazia Naoreen
(74) *Attorney, Agent, or Firm* — Kwan & Olynick LLP (57) ABSTRACT

Disclosed herein are systems, methods, and devices for seamless switching between multiple source streams. Systems include a transmitter that includes encoders configured to generate and encode media streams for transmission. Systems also include a receiver configured to receive the media streams. The receiver includes decoders configured to receive and decode the media streams for display at a display unit. The systems may also include a buffer configured to buffer at least some of the media streams, the streams including at least one primary media stream and at least one secondary media stream, the buffer being configured to provide the a primary media stream to a decoder, and the buffer being further configured to buffer and discard the a secondary media stream. The systems also include a controller configured to switch the buffer to provide a secondary media stream to a decoder responsive to identifying a request for a switch event.

20 Claims, 6 Drawing Sheets

(56) References Cited

U.S. PATENT DOCUMENTS

| | | | |
|---|---|---|---|
| 9,367,501 B2* | 6/2016 | Idziorek | G06F 13/385 |
| 9,525,710 B2 | 12/2016 | Weißmann et al. | |
| 9,826,279 B2* | 11/2017 | Putterman | H04N 21/4438 |
| 10,785,485 B1* | 9/2020 | Girard | H04N 19/149 |
| 2002/0133247 A1 | 9/2002 | Smith et al. | |
| 2004/0194134 A1* | 9/2004 | Gunatilake | H04N 21/44008 |
| | | | 725/38 |
| 2006/0059411 A1* | 3/2006 | Dacosta | H04L 1/0051 |
| | | | 714/794 |
| 2006/0101111 A1* | 5/2006 | Bouse | H04L 47/27 |
| | | | 709/200 |
| 2016/0094468 A1 | 3/2016 | May, Jr. et al. | |
| 2017/0324792 A1* | 11/2017 | Estrop | H04L 65/60 |

* cited by examiner

SYSTEMS, METHODS, AND DEVICES FOR SEAMLESS SWITCHING BETWEEN MULTIPLE SOURCE STREAMS

CROSS-REFERENCE TO RELATED APPLICATIONS

This application claims the benefit under 35 U.S.C. § 119(e) of U.S. Provisional Patent Application No. 62/347,037, filed on Jun. 7, 2016, which is incorporated herein by reference in its entirety for all purposes

TECHNICAL FIELD

The present disclosure relates to the field of internet protocol (IP) networks, and more particularly to high-bandwidth digital content compliance over IP networks.

DESCRIPTION OF RELATED ART

Digital media content may include audio and visual information that may be rendered and displayed at display devices. Such digital media content may be transmitted over a communications network for display at a target display device. Accordingly, a transmitter may generate a media stream that is a stream or streams of data that represents the digital media content. The media stream may be transmitted over the communications network and may be provided to a display unit for display. While such digital media content may be transmitted over a communications network, traditional techniques remain limited because of the latency that occurs when implementing a switch between different media streams.

SUMMARY

Disclosed herein are systems that may include a transmitter configured to transmit a plurality of media streams, the plurality of media streams being packetized streams of data configured for network transmission, the transmitter being implemented on a first physical node, the transmitter including a plurality of encoders configured to generate and encode the plurality of media streams for transmission. Systems may also include a receiver configured to receive the plurality of media streams, the receiver being implemented on a second physical node. The receiver may include a plurality of decoders configured to receive and decode the plurality of media streams for display at a display unit. The systems may also include a buffer configured to buffer at least some of the plurality of media streams, the plurality of media streams including at least one primary media stream and at least one secondary media stream, the buffer being configured to provide the at least one primary media stream to at least one decoder, and the buffer being further configured to buffer and discard the at least one secondary media stream. The systems may also include a controller including one or more processors configured to switch the buffer to provide the at least one secondary media stream to at least one decoder responsive to identifying a request for a switch event.

In various embodiments, the buffer is configured to buffer several secondary media streams while providing the at least one primary media stream to at least one decoder. In some embodiments, the buffer is configured to switch to the at least one secondary media stream after it has been buffered. In some embodiments, the systems further include a sink coupled to the buffer and configured to remove discarded media streams from the buffer, and a bit bucket coupled to the sink. In various embodiments, the first physical node and the second physical node are implemented in different geographical regions and different parts of a network topology. In some embodiments, the systems further include additional transmitters and additional receivers. In various embodiments, each of the plurality of media streams includes audio and visual data capable of being presented at a display unit to a user. In some embodiments, the display unit includes an arrangement of multiple display devices, wherein each of the display devices is configured to display one or more display windows, and wherein each display window is configured to display a media stream. In various embodiments, the display devices of the display unit are within line of sight of the same user.

Also disclosed herein are devices that may include, a communications interface configured to receive a plurality of media streams, the plurality of media streams being packetized streams of data configured for network transmission. The devices may further include a plurality of decoders configured to receive and decode the plurality of media streams for display at a display unit. The devices may further include a buffer configured to buffer at least some of the plurality of media streams, the plurality of media streams including at least one primary media stream and at least one secondary media stream, the buffer being configured to provide the at least one primary media stream to at least one decoder, the buffer being further configured to buffer and discard the at least one secondary media stream, and the buffer being further configured to switch to provide the at least one secondary media stream to at least one decoder responsive to identifying a request for a switch event.

In some embodiments, the buffer is configured to buffer several secondary media streams while providing the at least one primary media stream to at least one decoder. In various embodiments, the buffer is configured to switch to the at least one secondary media stream after it has been buffered. In some embodiments, the devices further include a sink coupled to the buffer and configured to remove discarded media streams from the buffer, and a bit bucket coupled to the sink. In various embodiments, each of the plurality of media streams includes audio and visual data capable of being presented at a display unit to a user. In some embodiments, the communications interface, the plurality of decoders, and the buffer are implemented on a same physical node.

Further disclosed herein are methods that may include, receiving a plurality of media streams at a communications interface, the plurality of media streams being packetized streams of data configured for network transmission, the plurality of media streams including at least one primary media stream and a plurality of secondary media streams. The methods may also include buffering the plurality of secondary media streams at a buffer, the buffer being coupled with a decoder, and providing the at least one primary media stream from the buffer to the decoder for decoding and display at a display unit associated with the decoder. The methods may further include switching from the at least one primary media stream to at least one secondary media stream responsive to identifying a switch request, the switching being implemented by the buffer.

In some embodiments, the methods further include discarding unused secondary media streams from the buffer. In various embodiments, the methods further include providing the at least one primary media stream to the display unit, and providing, after the switching, the at least one secondary media stream to the display unit. In some embodiments, the methods further include updating the identified at least one primary media stream and the plurality of secondary media streams. In various embodiments, the switch request is received from a controller implemented on a separate physical node from the buffer and the decoder.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

As discussed above, conventional techniques remain limited due to large latencies associated with switches between media streams. Such latencies may result in noticeable lag times between media streams when viewed by a user of a display unit on which the media stream is displayed. Such latencies may arise from the time required identify, request, and retrieve the media stream that is being switched to. In various embodiments, protocols used to implement such switches in a manner compliant with content protection protocols may include numerous round trip delays (requests and responses) between components. For example, a single stream request may include 4 round trip related delays. Latencies may also arise from buffering of the new media stream once it has been received. More specifically, once the new stream has been requested and received, there may be buffer delays associated with both the transmitter and the receiver. For example, a transmitter may need to start the encoder, and fill a transmit buffer before the media stream is transmitted. Once transmitted and received, a buffer included in the decoder must buffer the stream, and the stream is provided to the decoder only after the receiver buffer is full. In such techniques, the previously described latencies occur after a switch has been requested. Accordingly, the time taken to implement the switch is relatively large and results in a noticeable latency as well as potentially dropped video frames.

Various embodiments disclosed herein provide receivers associated with display units that may be configured to receive at least one primary media stream as well as one or more other secondary media streams that are received and buffered. When a switch is implemented, the receiver may seamlessly switch over to a secondary stream that is already being buffered. Moreover, such a switch may be made prior to being provided to a decoder. The stream that has been switched to may then be decoded and provided for display. As will be discussed in greater detail below, multiple primary streams may be concurrently streamed to multiple display windows implemented on display devices of a display unit. As will be discussed in greater detail below, primary streams may be media streams that are currently being displayed, and secondary streams may be streams that are not being displayed. Accordingly, the switch may be implemented concurrently for one or multiple medial streams. In this way, a switch may be made to a media stream that is currently being buffered, thus implementing the switch with minimal latency. Moreover, such a switch may be implemented prior to a decoder of the receiver, but while the buffer is already full. Accordingly, the latency associated with the switch may be further reduced. In this way, systems and devices disclosed herein may be configured to have novel switching functionalities that enable media stream switching that appears seamless and latency-free from the perspective of the user viewing the target display unit.

Moreover, systems may be implemented such that many streams can be implemented and associated with a single decoder. As will be discussed in greater detail below, a buffer and associated components in a receiver may handle multiple media streams, and provide the appropriate stream to a particular decoder. In this way, a decoder is not required for each received media stream, and fewer decoders may be used. Accordingly, the system and resource utilization may be improved because system resource usage is reduced.

Figure 1:
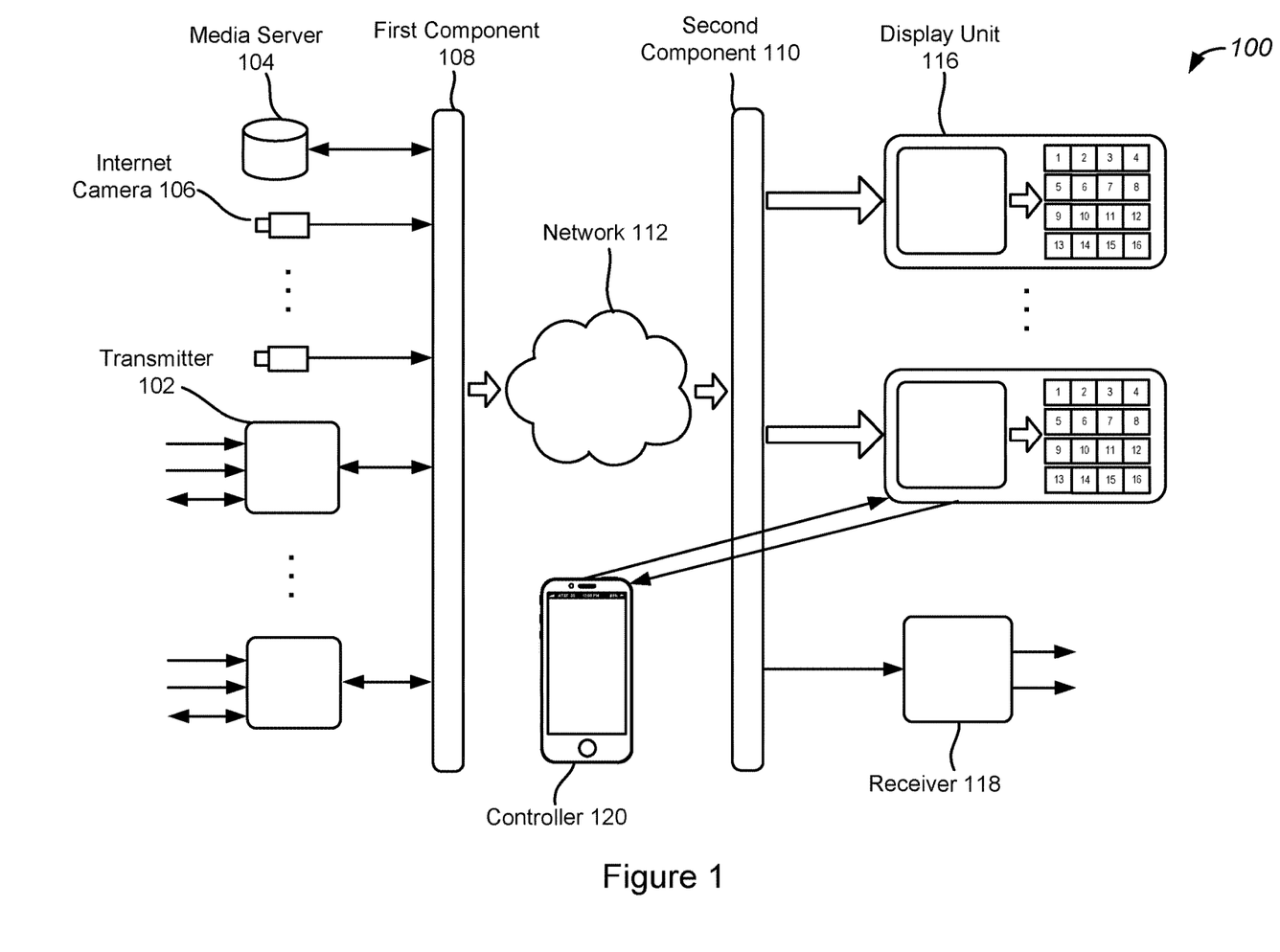
FIG. 1 illustrates an example of a system for seamless switching between multiple source streams, implemented in accordance with some embodiments.

FIG. 1 illustrates an example of a system for seamless switching between multiple source streams, implemented in accordance with some embodiments. As will be discussed in greater detail below, a system, such as system 100, may include multiple media sources that may generate media streams for display at display devices of display units. The media streams may be received at receivers which may be configured to decode the media streams and provide them to the display devices for display. As will be discussed in greater detail below, the receivers may be configured such that they maintain availability of additional media streams to enable seamless switching between media streams. Accordingly, the implementation of such available secondary media streams in conjunction with implementation prior to decoding, among other features, enables seamless switching between media streams in a manner that results in reduced latency associated with such switches.

In various embodiments, system 100 may include various sources that may be configured to transmit one or more media streams. As discussed above, such media streams may include media content that is included in audio and video data streams. Such media content may be of a type consistent with a particular media format or media container. Moreover, such sources may be configured to transmit such media streams in a manner compliant with various protection standards, such as high-bandwidth digital content protection (HDCP). In one example, such sources may include transmitters, such as transmitter 102.

As shown in FIG. 1, transmitter 102 may include various ports or interfaces that are configured to receive media signals for transmission. As discussed above, such a media signal may include audio and video information. Transmitter 102 may further include an encoder which may be configured to encode the received signal for transmission over a network, such as network 112 discussed in greater detail below. In various embodiments, the encoder included in transmitter 102 may be configured to implement the packetization of the received media content as well as the implementation of one or more content protection protocols. In this way, streams may be packetized for network transmission, and in a manner that is compliant with one or more content protection protocols, such as HDCP. In some embodiments, transmitter 102 may be configured to generate a primary and preview stream simultaneously, and such streams may be provided as an output. In various embodiments, transmitter 102 may be configured for various types of transmission, such as 1-1 transmission in which one stream is provided to one source. Transmitter 102 may also be configured for 1-M transmission in which one stream is provided to multiple sources simultaneously. As described in greater detail below with reference to FIG. 2, transmitter 102 may include numerous encoders, and may be configured to receive multiple streams for encoding concurrently.

Sources may further include various other entities, such as media server 104 that may be configured to provide access to stored media content that may be stored at the server or in an attached storage system. Sources may also include internet cameras, such as internet camera 106, that may be configured to capture audio and video information and transmit such audio and video information as streams over the network. While some examples of media sources have been described above, it will be appreciated that other entities coupled with network 112 may include any other suitable entity capable of generating a media stream.

System 100 may also include various other components, such as first component 108 and second component 110 which may be configured to route network traffic between components of system 100 over a network, such as network 112. Accordingly, first component 108 and second component 110 may be switches or servers that are configured to route packetized data streams that may be sent between components coupled to network 112, such as transmitter, internet cameras, media servers, as well as display units and receivers discussed in greater detail below.

System 100 may further include various display units that may be configured to display one or more media streams. More specifically, display units, such as display unit 116, may be configured to display multiple presentations of media streams concurrently. Accordingly, display unit 116 may be configured to include multiple display devices that each display a media stream. For example, display unit 116 may include a combination of 2×2 display devices in which the four display devices, which may be monitors, are arranged as a matrix and viewable as a single combined display. In various embodiments, display unit 116 may include a MXN configuration of displays. For example, display unit 116 may include a 2×3 configuration, a 3×3 configuration, a 3×4 configuration, or a 4×4 configuration. While some examples of configurations have been provided, any suitable configuration is contemplated and disclosed herein. As discussed above, the display devices in the configuration of display unit 116 may be concurrently viewable by a user.

In various embodiments, such display units may be configured to receive media streams and display such media streams on the previously described display devices. As will be discussed in greater detail below, display unit 116 may be configured to implement the display of streams in windows which may or may not be coextensive with the display devices. For example, multiple streams may be displayed in a multiple windows on a single display device. Accordingly, as will be discussed in greater detail below, media streams may be associated with windows, and windows may be mapped to display devices of a display unit. In this way, display unit 116 may concurrently display multiple media streams. As will also be discussed below, various components of system 100 may be configured to implement seamless and concurrent switching of such streams such that all streams displayed by display unit 116 switch concurrently from the perspective of a user viewing the display unit.

System 100 may also include various receivers that may be configured to receive encoded media streams, and may be further configured to decode them. Accordingly, receivers, such as receiver 118, may be configured to decode the media streams so that they may be displayed on the previously described display devices of display units. Moreover, receiver 118 may be configured to route the media streams to their appropriate destinations, and implement the seamless switching between media streams for display at their respective destinations. In various embodiments, such seamless switching may be implemented based on the concurrent use of a primary stream and a secondary stream. More specifically, a secondary stream, or background stream, may be received and buffered prior to decoding such that switching may be implemented to the secondary stream in a seamless manner responsive to a request to switch streams. Additional details of the implementation of such seamless switching will be discussed in greater detail below with reference to FIG. 2. While receiver 118 is shown as separate from display units, such as display unit 116, in various embodiments, receiver 118 may be included in a display unit, as described below with reference to FIG. 2. Accordingly, the configuration shown in FIG. 1 provides an example of an implementation of receiver 118 and is not intended to limit the scope of the disclosure in this respect.

In various embodiments, system 100 may also include controller 120 which may be configured to issue one or more commands associated with display units, such as display unit 116. For example, commands related to switching media streams, as will be discussed in greater detail below, may be received from a user at controller 120, and may be used to initiate a media stream switch. Furthermore, controller 120 may be configured to include one or more identifiers in such a request that may identify a media stream to be switched, a media stream that will be switched to, as well as an associated display device and display window. As will be discussed in greater detail below, such identifiers may be generated by controller 120, or may be generated by receiver 118. In various embodiments, controller 120 may be a processing device, such as a smartphone, a tablet, a personal computer, or other data processing device or system.

Figure 2:
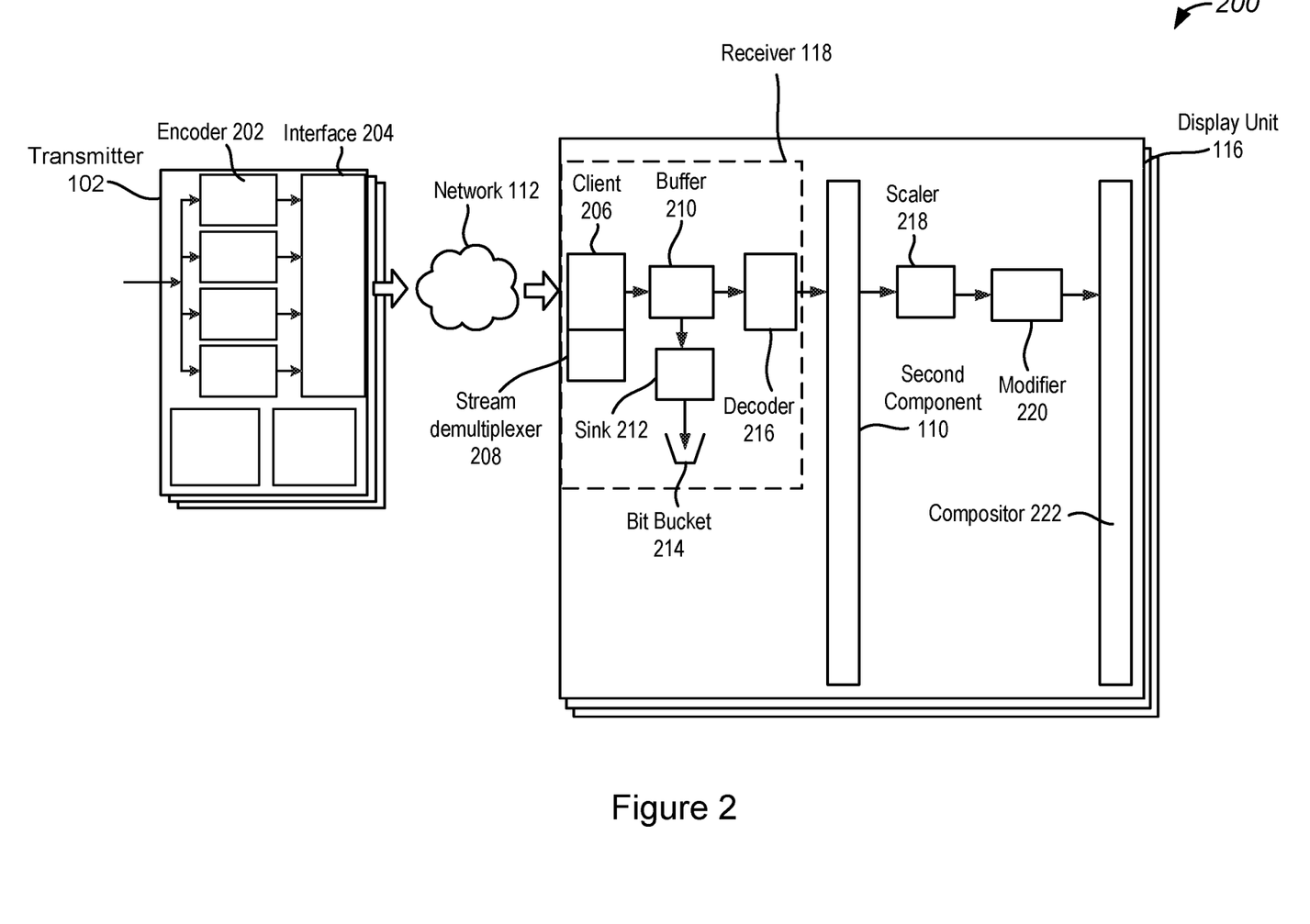
FIG. 2 illustrates another example of a system for seamless switching between multiple source streams, implemented in accordance with some embodiments.

FIG. 2 illustrates another example of a system for seamless switching between multiple source streams, implemented in accordance with some embodiments. As similarly discussed above, a system, such as system 200, may include multiple receivers which may be configured to decode media streams and provide them to the display devices for display. As will be discussed in greater detail below, the receivers may be further configured to maintain availability of additional media streams to enable seamless switching between media streams. In various embodiments, the receiver, such as receiver 118, may be included within a display unit, such as display unit 116. Accordingly, FIG. 2 illustrates a configuration in which receiver 118 is implemented as a part of display unit 116.

As discussed above, systems such as system 100 and system 200 may include a transmitter, such as transmitter 102. As shown in FIG. 2, transmitter 102 may include several transmitters as well as several encoders, such as encoder 202, which may be configured to implement the encoding of media content and generation of encoded streams for transmission over a communications network, such as network 112. As shown in FIG. 2, multiple encoders may be implemented to simultaneously generate multiple media streams. As also shown in FIG. 2, system 200 may include multiple transmitters. In various embodiments, transmitter 102 may further include an interface, such as interface 204, which may be coupled with network 112, and may be configured to handle the transmission of the media streams over network 112. Accordingly, interface 204 may multiplex the media streams such that they may be simultaneously transmitted over network 112 to another system component, such as receiver 118.

Accordingly, system 200 may include receiver 118. As similarly discussed above, while one receiver is described, system 200 may include any number of receivers, as well as any number of the components described within receiver 118. In various embodiments, receiver 118 may include client 206 which may be configured to receive multiple encoded media streams from network 112. In various embodiments, client 206 may include a stream demultiplexer, such as stream demultiplexer 208. In various embodiments, stream demultiplexer 208 may be configured to demultiplex the signal generated by interface 204, and extract the received multiple media streams. As similarly discussed above with reference to FIG. 1, receiver 118 may also include a decoder, such as decoder 216, which may be configured to decode the encoded media streams to recreate a media stream that is presentable in a display window associated with a display device.

In various embodiments, receiver 118 may also include a buffer, such as buffer 210, as well as associated components such as sink 212 and bit bucket 214. In various embodiments, buffer 210 may be configured to buffer one or more incoming media streams, such as a primary media stream as well as one or more secondary media streams. As shown in FIG. 2, buffer 210 is implemented before decoder 216. Accordingly, the buffering of streams and switching amongst streams, as will be discussed in greater detail below, is implemented prior to decoding, and on data while still in a packetized state.

Accordingly, buffer 210 may buffer a primary stream and pass the primary stream along to decoder 216 for decoding. Buffer may also buffer secondary streams that are received from a transmitter. As will be discussed in greater detail below, such secondary streams may be available streams that may be switched to seamlessly responsive to a received switch command. In various embodiments, buffer 210 may buffer multiple secondary streams that are identified or designated based on one or more switching parameters. Accordingly, in some embodiments, a system component, such as controller 120, may designate and identify several secondary streams that may be associated with a particular primary stream. In some embodiments, such secondary media streams may be identified based on a mapping stored at receiver 118. Accordingly, in response to receiving a particular media stream, receiver 118 may identify and buffer several secondary streams in anticipation of a potential media stream switch. The buffered streams may be retained within buffer 210 for a designated period of time before passing to sink 212 which may be configured to manage the deletion and removal of data from buffer 210. The buffered streams may then be passed to bit bucket 214 for deletion.

In various embodiments, a number of secondary media streams may be determined dynamically and based on available resources. Accordingly, a system component, such as the receiver, may be configured to determine a number of secondary media streams that may be supported based on one or more resource parameters, such as available buffer capacity, available processing capacity, and available network bandwidth.

In various embodiments, and as will be discussed in greater detail below, buffer 210 may be further configured to implement a media stream switch responsive to receiving a switch command. Accordingly, buffer 210 may switch from providing the primary media stream to decoder 216, to providing a selected or designated secondary media stream to decoder 216. In this way, receiver 118 may be configured to identify and buffer multiple secondary streams, maintain availability of those media streams, and implement a media stream switch prior to decoding being implemented on the received media streams.

System 200 may further include second component 110, which may be configured as a router implemented within a display unit, such as display unit 116. Accordingly, second component 110 may be configured to handle the routing of media streams within display unit 116 and amongst display devices of display unit 116. In various embodiments, system 200 may also include scaler 218 which may be configured to scale the media stream, and frames included in the media stream to a particular size and resolution. In various embodiments, such a size and resolution may be determined based on one or more characteristics of the target window and/or display device. Accordingly, scaler 218 may scale the media stream based on the size and resolution of the target destination.

In some embodiments, System 200 may also include modifier 220 which may be configured to modify one or more aspects of a presentation of the media stream. For example, modifier may be configured to add a border or additional text to the media stream. In this way, a final presentation of the media stream may be modified. System 200 may additionally include compositor 222 which may be configured to combine multiple source streams into a single image for display at a target window or display device.

Figure 3:
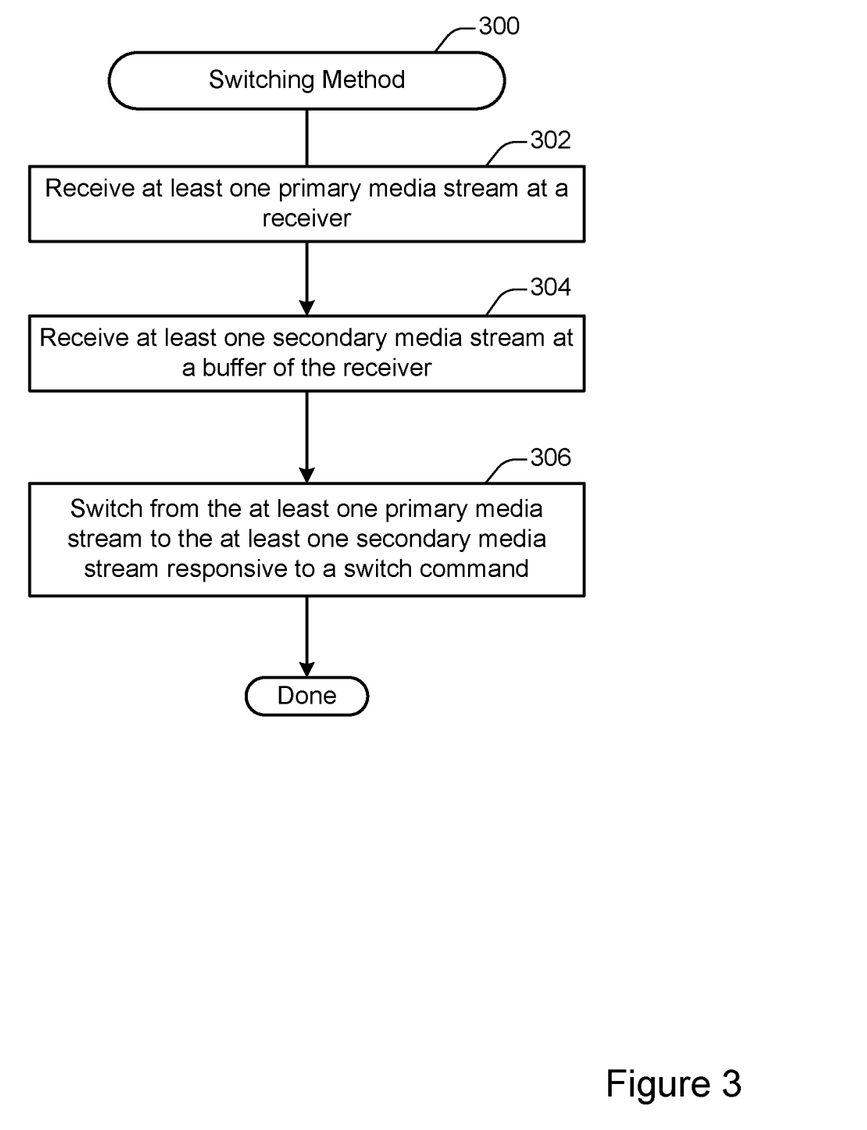
FIG. 3 illustrates a flow chart of an example of a method for seamless switching between multiple source streams, implemented in accordance with some embodiments.

FIG. 3 illustrates a flow chart of an example of a method for seamless switching between multiple source streams, implemented in accordance with some embodiments. As will be discussed in greater detail below, receivers that receive the media streams may be configured such that switching between media streams may be implemented with little latency. Accordingly, at 302, at least one primary media stream may be received at a receiver. In various embodiments, as similarly discussed above, the primary media stream may be a media stream that may be considered as implemented in a "foreground" of the receiver, and may be provided to a decoder and displayed at a display unit. Accordingly, the primary media stream may be viewable by a user that has a line of sight to the display device. Moreover, it will be appreciated that the receiver may handle multiple primary media streams. Accordingly, several primary media streams may be received and displayed concurrently.

At 304, at least one secondary media stream may be received at a buffer of the receiver. As will be discussed in greater detail below, various secondary media streams may be identified and retrieved by the receiver as well. In various embodiments, such secondary media streams may be identified based, at least in part, on the identified primary media stream. Accordingly, several additional media streams may be retrieved and buffered in a "background" of the receiver, and may be made available for a subsequent switch operation. Moreover, the additional media streams may be buffered prior to being decoded.

At 306, a switch may be implemented from the at least one primary media stream to the at least one secondary media stream. As will be discussed in greater detail below, the switch may be implemented by providing one of the secondary media streams to the encoder as a new primary media stream. In this way, a switch may be made to a media stream that is currently being buffered, thus implementing the switch quickly and with minimal latency. Moreover, such a switch may be implemented prior to a decoder of the receiver, thus further reducing the latency associated with the switch. In this way, the switching may appear seamless and latency-free from the perspective of the user viewing the target display unit.

Figure 4:
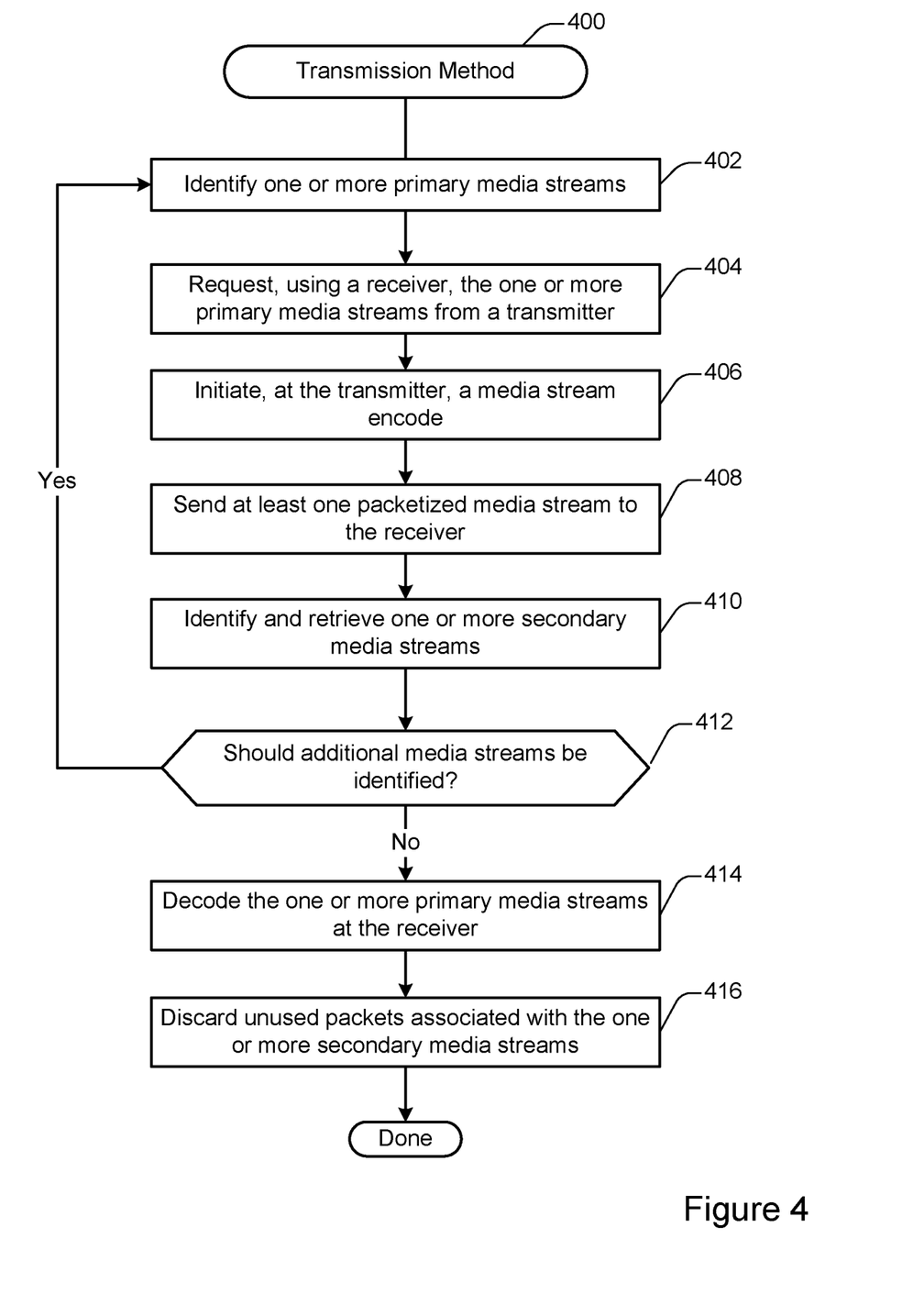
FIG. 4 illustrates a flow chart of another example of a method for seamless switching between multiple source streams, implemented in accordance with some embodiments.

FIG. 4 illustrates a flow chart of another example of a method for seamless switching between multiple source streams, implemented in accordance with some embodiments. As will be discussed in greater detail below, receivers that receive and decode media streams for display in display units may be configured to receive and display one or more primary media streams while also identifying and temporarily retaining one or more associated secondary media streams. As will also be discussed in greater detail below with reference to FIG. 5, such secondary media streams enable switching media streams without latency incurred by requesting and retrieving a media stream at the time of the switch. Moreover, such switching may be implemented prior to a decoder, thus further reducing the latency associated with the switch.

At 402, one or more primary media streams may be identified. As similarly discussed above, primary media streams may be video streams that have been selected to be displayed on one or more windows implemented on display devices of one or more display units. In various embodiments, a request identifying the primary media streams may be received at a controller and sent to a receiver to configure the receiver to retrieve the primary media streams and implement them as foreground media streams. In various embodiments, the media streams may have unique identifiers, such as a stream identifier, that may be generated and assigned at creation of the media stream. In some embodiments, the controller may generate other identifiers associated with the media stream, such as a window identifier that identifies a target window associated with the media stream. Other identifiers may be utilized as well, such as a clock identifier and a date identifier that may provide regional and temporal information associated with the target display unit.

At 404, the one or more primary media streams may be requested. Accordingly, in response to receiving the identified primary media streams, the receiver may request the primary media streams from the appropriate sources. In some embodiments, the receiver may receive the identified primary media streams in a message sent from the controller, and the message may also include identifiers that identify a source of the media stream as well as a target of the media stream. In some embodiments, such source and target information may be stored locally at the receiver, and, in some embodiments, such information may be propagated amongst receivers such that a local mapping of media streams to sources and targets is maintained and updated. Accordingly, the receiver may identify the sources of the media streams, which may be transmitters that include encoders as discussed above, and the receiver may issue a request to the transmitters for the identified primary media streams.

At 406, a transmitter may initiate a media stream encode. Accordingly, the transmitters that receive the requests may generate the primary media streams responsive to receiving the request. As discussed above, this may include encoding and packetizing media content for network transmission that is compliant with a content protection standard. In this way, encoded media streams may be generated for the requested primary media streams.

At 408, packetized media streams may be sent to the receiver. Accordingly, as discussed above, the packetized media streams may be routed over a communications network to the receiver, and the receiver may receive the primary media stream via a communications interface. As discussed above with reference to FIG. 2, the received primary media streams may be buffered before being provided to a decoder, as discussed in greater detail below.

At 410, one or more secondary media streams may be identified. In various embodiments, the secondary media streams may be identified, at least in part, based on the primary media stream. Accordingly, a component, such as the controller, may be configured to identify one or more secondary media streams based on the identified primary media stream. In some embodiments, the controller, or a receiver, may store designated associations between media streams. More specifically, in response to identifying a first stream identifier for a primary media stream, one or more second stream identifiers may be looked up and identified based on a stored mapping. In some embodiments, such a mapping may be user defined. Accordingly, several additional media streams may be identified that are associated with the primary media stream. As will be discussed in greater detail below, the secondary media streams may be streams implemented in a background at the receiver, and may represent media streams that may be potentially switched to.

At 412, it may be determined if additional media streams should be identified. In various embodiments, such a determination may be made based on an input received from a controller. For example, the controller may receive an input indicating that a different primary media stream has been selected. In another example, the controller may determine that additional primary media streams exist and should be selected. In such an example, method 400 may return to operation 402. If it is determined that no additional media streams should be identified, then method 400 may proceed to operation 414.

At 414, the one or more primary media streams may be decoded. Accordingly, as discussed above with reference to FIG. 2, the primary media streams may be passed from the buffer to a decoder at which point the primary media streams may be converted from packetized data to a media stream that includes frames that may be rendered and presented at a display device of a display unit. In this way, the media streams may be presented at the appropriate windows of display devices of display units.

At 416, unused packets are discarded. In various embodiments, the unused packets may be those of the secondary media streams. Accordingly, the secondary media streams may be received at the receiver, buffered for a designated period of time, and then discarded after the designated amount of time. As will be discussed in greater detail below with reference to FIG. 5, while such secondary media streams may be buffered and discarded in a background at the receiver prior to decoding occurs, such secondary media streams may also provide media streams that may be switched to with little latency and in a seamless manner.

Figure 5:
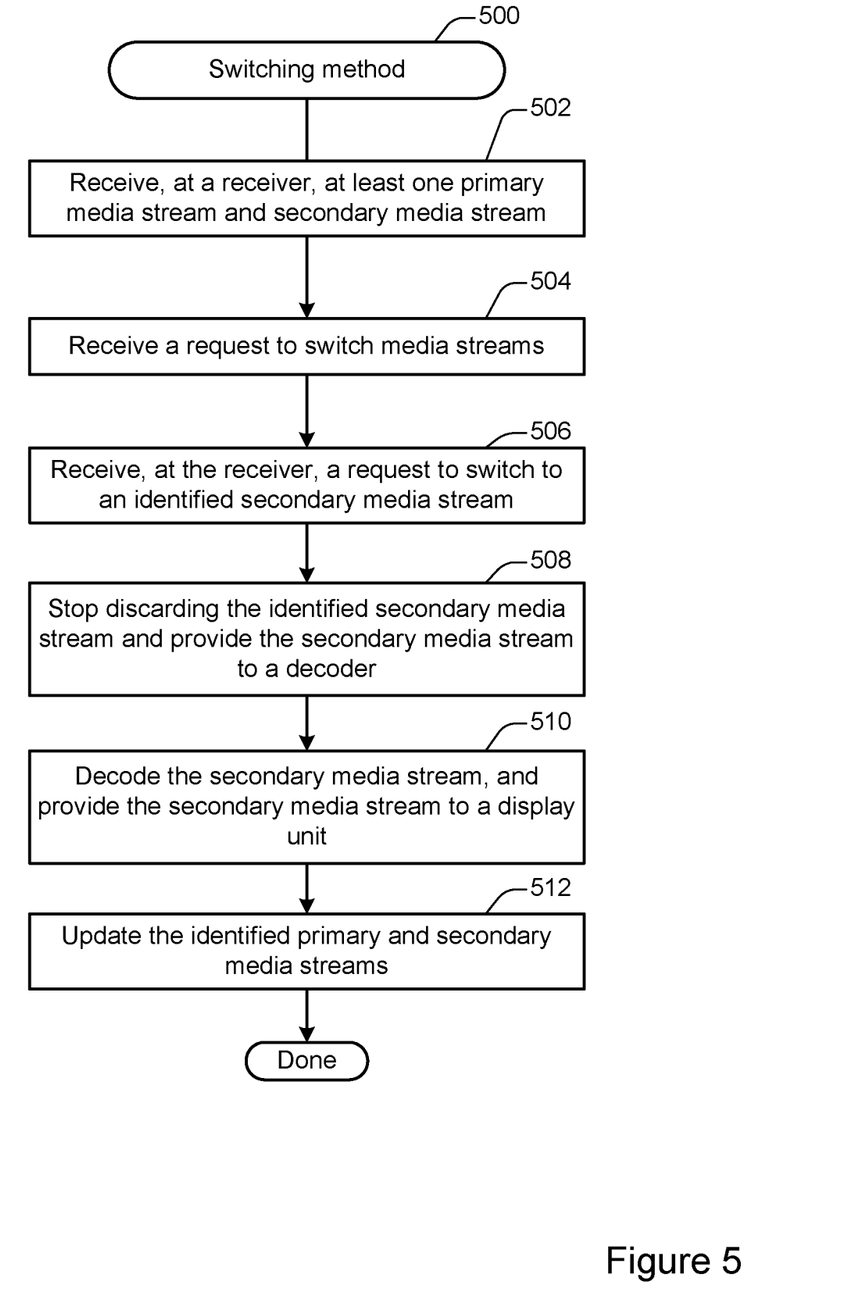
FIG. 5 illustrates a flow chart of yet another example of a method for seamless switching between multiple source streams, implemented in accordance with some embodiments.

FIG. 5 illustrates a flow chart of yet another example of a method for seamless switching between multiple source streams, implemented in accordance with some embodiments. As discussed above, receivers may be configured to receive and display one or more primary media streams while also identifying and temporarily retaining one or more associated secondary media streams. As will be discussed in greater detail below, receivers may also be configured to implement switches between media streams such that a media stream displayed at a particular window of a display unit may be switched. In various embodiments, the secondary media streams may be buffered, and may be switched to responsive to receiving a switch request. Because the secondary media streams are already available and have been requested and retrieved, the switch may be implemented with reduced latency at the time of the switch. As also discussed in greater detail below, such switching may be implemented prior to a decoder, thus further reducing the switching latency.

At 502, at least one primary media stream and secondary media stream may be received at a receiver. As discussed above with reference to FIG. 5, primary and secondary media streams may be identified and retrieved by a receiver. Accordingly, primary media streams may be decoded and provided to windows for display, while unused secondary media streams may be buffered and packets may be discarded if unused.

At 504, a request to switch media streams may be received. In various embodiments, the request may be received at a system component, such as a controller. Accordingly, the request may be received at the controller and may be received from another entity, such as a user or other system component. In some embodiments, the request may be received responsive to one or more designated switch events occurring, such as the passage of a designated amount of time, or one or more other system components implementing a switch. In various embodiments, such a switch may be requested in various viewing environments or contexts, such as when a user may be viewing one or more of multiple remote streams, and requests a switch a switch between them. More specifically, the user may be switching back and forth between multiple remote streams.

At 506, a request to switch to an identified secondary media stream may be received at the receiver. Accordingly, the receiver may receive a request to implement a switch. Such a request may have been generated by a system component, such as a controller, and may have been sent to the receiver. Thus, according to some embodiments, the controller may determine that a switch should be made, and may send a request to the receiver. In various embodiments, the switch request may include one or more identifiers that identify the media stream to be switched to. In some embodiments, the switch request may include additional identifiers such as a target and source of the media stream that is to be switched to.

At 508, the receiver may stop discarding the identified secondary media stream and provide the secondary media stream to a decoder. Accordingly, the receiver may identify a particular secondary media stream based on the received identifiers, and may provide the identified secondary media stream to the decoder as a new primary media stream. In this way, the media streams that are decoded and displayed at windows of the display unit may be switched from a primary media stream to a secondary media stream prior to decoding. In this way, latency associated with the switch is reduced, and switching to the new media stream appears seamless from the perspective of a viewer of the display unit.

In various embodiments, a requested secondary media stream might not already be running in a background at the receiver. Accordingly, the receiver may be configured to identify a source associated with the requested secondary media stream, request the secondary media stream from the source, receive the secondary media stream, and provide the secondary media stream to the decoder. In this way, switch requests may be handled even when the secondary stream is not already running in a background at the receiver.

At 510, the secondary media stream may be decoded by the decoder, and provided to a display device of a display unit. Accordingly, as discussed above, the secondary media stream may be decoded, and converted to a format that may be presented at the target window. Accordingly, the secondary media stream that was switched to may now be decoded and rendered for display at the display unit. As discussed above, it will be appreciated that there may be multiple primary media streams that are being displayed simultaneously. Thus, according to various embodiments, multiple secondary media streams are identified, switched to, and subsequently displayed.

At 512, the identified primary and secondary media streams may be updated. Accordingly the secondary media stream that was switched to may now be identified as the primary media stream. Moreover, additional secondary media streams may be identified based on media streams associated with the media stream that has been switched to. Such associations and mappings have been discussed in greater detail above with reference to FIG. 5. Accordingly, the secondary media streams implemented in a background may be updated based on the switching. In various embodiments, the secondary media streams may also be updated to include the previous primary media stream. Accordingly, the old primary media stream may be buffered as a secondary media stream and may be added to the identified secondary media streams in this way. In various embodiments, the old primary media stream may be terminated if appropriate.

Figure 6:
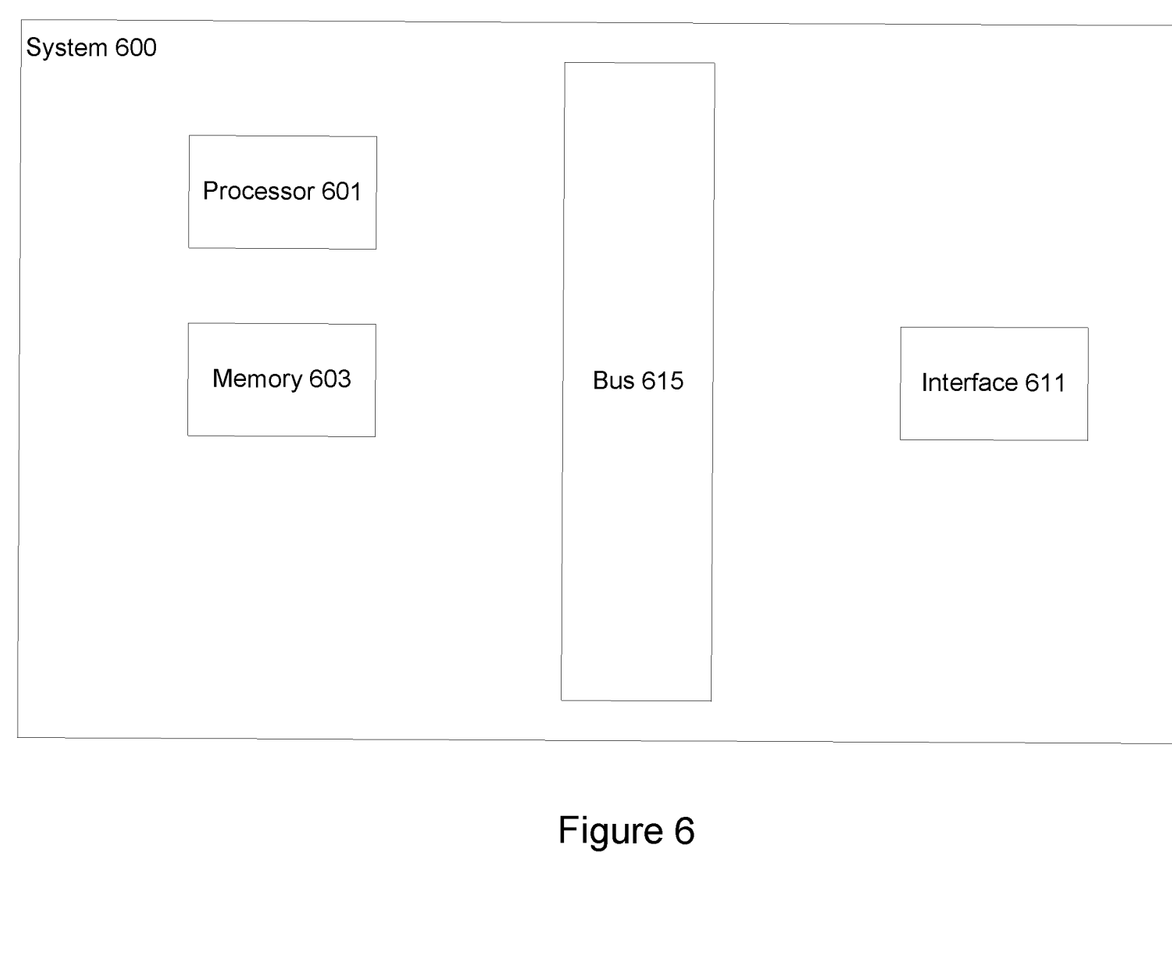
FIG. 6 illustrates one example of a processing system, configured in accordance with some embodiments.

FIG. 6 illustrates one example of a processing system, configured in accordance with some embodiments. According to particular embodiments, a system 600 suitable for implementing particular embodiments of the present invention includes a processor 601, a memory 603, an interface 611, and a bus 615 (e.g., a PCI bus or other interconnection fabric). In various embodiments, system 600 may be configured to operate as a receiver. When acting under the control of appropriate software or firmware, the processor 601 is responsible for receiving and decoding media streams. Various specially configured devices can also be used in place of a processor 601 or in addition to processor 601. The interface 611 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 600 is a receiver configured to receive and decode media streams. For example, the system 600 may be configured as receiver 118 shown in FIG. 1. The receiver may include one or more hardware elements as shown in FIG. 6. In various embodiments, additional instances of system 600 may also be used to implement other components, such as a transmitter and/or a controller. More specifically, additional instances of system 600 may also be used to implement controller 120 and transmitter 102 shown in FIG. 1. Although particular embodiments are described, it should be recognized that a variety of alternative configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A system comprising:
    a transmitter configured to transmit a plurality of media streams, the plurality of media streams being packetized streams of data configured for network transmission, the transmitter being implemented on a first physical node, the transmitter comprising a plurality of encoders configured to generate and encode the plurality of media streams for transmission;
    a receiver configured to receive the plurality of media streams, the receiver being implemented on a second physical node, the receiver comprising:
        a plurality of decoders configured to receive and decode the plurality of media streams for display at a display unit;
        a buffer configured to buffer the plurality of media streams received by the receiver, the plurality of media streams comprising at least one primary media stream and at least one secondary media stream, the at least one secondary media stream being identified based, at least in part, on the at least one primary media stream, the buffer being configured to provide the at least one primary media stream to at least one decoder, and the buffer being further configured to buffer and discard the at least one secondary media stream via a sink coupled to an output of the buffer;
        a bit bucket coupled to an output of the sink and configured to delete discarded data received from the sink, wherein the buffer, the sink, and the bit bucket are implemented before an input of the at least one decoder; and
    a controller comprising one or more processors configured to switch an output of the buffer to provide the at least one secondary media stream to at least one decoder responsive to identifying a request for a switch event, and to discard the at least one primary media stream via the sink.

2. The system of claim 1, wherein the buffer is configured to buffer several secondary media streams while providing the at least one primary media stream to at least one decoder.

3. The system of claim 2, wherein the buffer is configured to switch to the at least one secondary media stream after it has been buffered.

4. The system of claim 3 wherein, the sink is coupled to the buffer and configured to remove discarded media streams from the buffer.

5. The system of claim 1, wherein the first physical node and the second physical node are implemented in different geographical regions and different parts of a network topology.

6. The system of claim 1 further comprising additional transmitters and additional receivers.

7. The system of claim 1, wherein each of the plurality of media streams includes audio and visual data capable of being presented at a display unit to a user.

8. The system of claim 7, wherein the display unit comprises an arrangement of multiple display devices, wherein each of the display devices is configured to display one or more display windows, and wherein each display window is configured to display a media stream.

9. The system of claim 8, wherein the display devices of the display unit are within line of sight of the same user.

10. A device comprising:
    a communications interface configured to receive a plurality of media streams, the plurality of media streams being packetized streams of data configured for network transmission;
    a plurality of decoders configured to receive and decode the plurality of media streams for display at a display unit;
    a buffer configured to buffer the plurality of media streams received at the communications interface, the plurality of media streams comprising at least one primary media stream and at least one secondary media stream, the at least one secondary media stream being identified based, at least in part, on the at least one primary media stream, the buffer being configured to provide the at least one primary media stream to at least one decoder, the buffer being further configured to buffer and discard the at least one secondary media stream via a sink coupled to an output of the buffer, and the buffer being further configured to switch to provide the at least one secondary media stream to at least one decoder responsive to identifying a request for a switch event, and to discard the at least one primary media stream via the sink; and
    a bit bucket coupled to an output of the sink and configured to delete discarded data received from the sink, wherein the buffer, the sink, and the bit bucket are implemented before an input of the at least one decoder.

11. The device of claim 10, wherein the buffer is configured to buffer several secondary media streams while providing the at least one primary media stream to at least one decoder.

12. The device of claim 11, wherein the buffer is configured to switch to the at least one secondary media stream after it has been buffered.

13. The device of claim 12, wherein the sink is coupled to the buffer and configured to remove discarded media streams from the buffer.

14. The device of claim 10, wherein each of the plurality of media streams includes audio and visual data capable of being presented at a display unit to a user.

15. The device of claim 10, wherein the communications interface, the plurality of decoders, and the buffer are implemented on a same physical node.

16. A method comprising:
    receiving a plurality of media streams at a communications interface, the plurality of media streams being packetized streams of data configured for network transmission, the plurality of media streams comprising at least one primary media stream and a plurality of secondary media streams;

buffering, using a buffer, the plurality of media streams received at the communications interface, the buffer being coupled with a decoder;

providing the at least one primary media stream from the buffer to the decoder for decoding and display at a display unit associated with the decoder, wherein the plurality of secondary media streams is identified based, at least in part, on the at least one primary media stream;

discarding at least some of the plurality of secondary media streams at a sink coupled to an output of the buffer;

switching an output of the buffer from the at least one primary media stream to at least one secondary media stream responsive to identifying a switch request, the switching being implemented by the buffer; and discarding the at least one primary media stream via the sink responsive to the switching; and deleting, using a bit bucket, the discarded at least one primary media stream, the bit bucket being coupled to an output of the sink, and the buffer, the sink, and the bit bucket being implemented before an input of the decoder.

17. The method of claim 16, wherein the at least some of the plurality of secondary media streams are unused secondary media streams.

18. The method of claim 16 further comprising:
providing the at least one primary media stream to the display unit; and
providing, after the switching, the at least one secondary media stream to the display unit.

19. The method of claim 18 further comprising:
updating the identified at least one primary media stream and the plurality of secondary media streams.

20. The method of claim 16, wherein the switch request is received from a controller implemented on a separate physical node from the buffer and the decoder.

* * * * *